US011821384B1

(12) United States Patent
Wang et al.

(10) Patent No.: US 11,821,384 B1
(45) Date of Patent: Nov. 21, 2023

(54) MANUFACTURING OF ALUMINUM PISTON WITH CAST IRON RING CARRIER USING POWDER BED FUSION METHOD

(71) Applicant: GM Global Technology Operations LLC, Detroit, MI (US)

(72) Inventors: Qigui Wang, Rochester Hills, MI (US); Jeffrey B. Harris, Detroit, MI (US); Ante Tony Lausic, Burlington (CA); Paul J Wolcott, Macomb, MI (US); Dale A. Gerard, Bloomfield Hills, MI (US); Tyson Whittier Brown, Royal Oak, MI (US)

(73) Assignee: GM GLOBAL TECHNOLOGY OPERATIONS LLC, Detroit, MI (US)

( * ) Notice: Subject to any disclaimer, the term of this patent is extended or adjusted under 35 U.S.C. 154(b) by 0 days.

(21) Appl. No.: 17/731,365

(22) Filed: Apr. 28, 2022

(51) Int. Cl.
*F02F 3/00* (2006.01)
*F16J 9/00* (2006.01)
*B22F 10/28* (2021.01)
*B33Y 10/00* (2015.01)
*B33Y 80/00* (2015.01)

(52) U.S. Cl.
CPC ............ *F02F 3/0084* (2013.01); *B22F 10/28* (2021.01); *B33Y 10/00* (2014.12); *B33Y 80/00* (2014.12); *F16J 9/00* (2013.01); *F02F 2200/00* (2013.01)

(58) Field of Classification Search
CPC .. F16J 9/00; B22F 10/28; B33Y 10/00; B33Y 80/00; F02F 3/0084
See application file for complete search history.

(56) References Cited

U.S. PATENT DOCUMENTS

2014/0299091 A1* 10/2014 Ribeiro ................... B22F 5/008
164/76.1
2020/0325988 A1* 10/2020 Barnes .................... F02F 3/003

FOREIGN PATENT DOCUMENTS

EP             3530400 A1 *  8/2019    ............. B22F 10/00

* cited by examiner

*Primary Examiner* — Kevin A Lathers
(74) *Attorney, Agent, or Firm* — Vivacqua Crane PLLC

(57) ABSTRACT

A method to manufacture an automobile vehicle engine aluminum piston, comprises: printing an aluminum piston crown portion including an additive manufacturing (AM) piston crown work piece using initial aluminum powders defining an initial aluminum powder bed; removing the aluminum piston crown portion from the initial aluminum powder bed; fixedly joining a cast iron ring carrier to the AM piston crown work piece; placing the aluminum piston crown portion together with the cast iron ring carrier into a secondary and a tertiary aluminum powder bed; and printing a piston skirt integrally connected to the AM piston crown work piece and to the cast iron ring carrier.

10 Claims, 3 Drawing Sheets

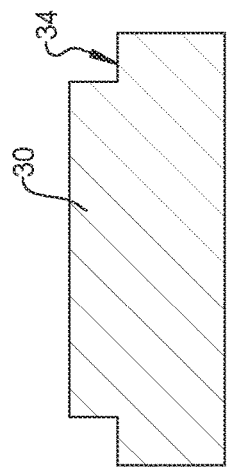
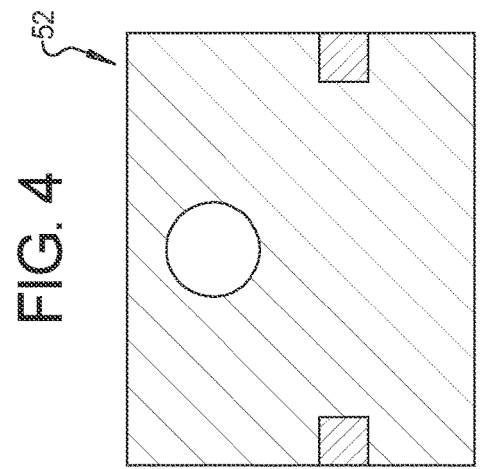
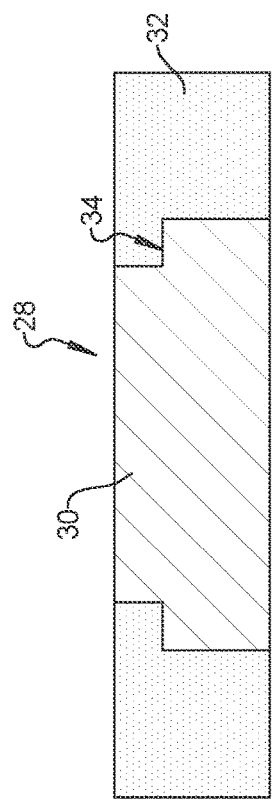
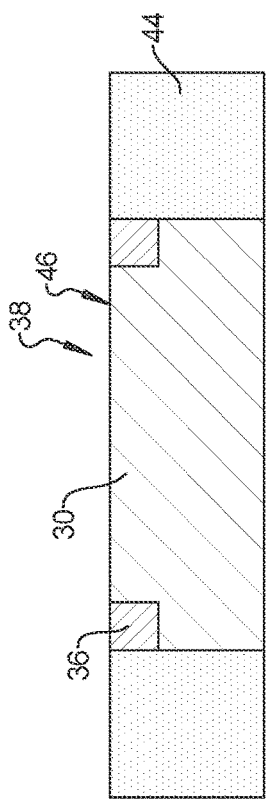

MANUFACTURING OF ALUMINUM PISTON WITH CAST IRON RING CARRIER USING POWDER BED FUSION METHOD

INTRODUCTION

The present disclosure relates to automobile vehicle engine pistons and manufacturing methods.

Automobile vehicle engine pistons are commonly manufactured from Al—Si hypereutectic aluminum alloys to minimize engine weight and may be cast using a casting process such as permanent mold casting. It is common to subsequently machine one or more ring grooves into a skirt of the piston which receive rings such as compression rings and oil retention rings. To increase piston high temperature performance and particularly wear resistance of the top compression ring groove, a cast iron ring carrier is commonly cast-in-place at the first ring area when an aluminum piston is cast. The machining steps are followed by completing the machining of ring grooves which receive at least one compression ring. The top cast iron ring groove must therefore be sized to allow installation of the compression ring. An additive manufacturing (AM) process has been found to significantly improve aluminum piston durability performance because of the refined microstructure and the reduced pore sizes. Particularly, additive manufacturing processes offer an opportunity to print non-castable alloys such as aluminum-copper (Al—Cu) and aluminum-cerium (Al—Ce) alloys which have excellent high-temperature properties, however the printing of an aluminum piston with a pre-formed cast iron ring carrier has not been achieved.

Thus, while current automobile vehicle piston manufacturing processes achieve their intended purpose, there is a need for a new and improved aluminum piston and cast iron ring carrier manufacturing process.

SUMMARY

According to several aspects, an automobile vehicle engine aluminum piston includes: a printed aluminum piston crown portion including an additive manufacturing (AM) piston crown work piece printed using initial aluminum powders defining an initial aluminum powder bed; a ring carrier fixedly joined to the AM piston crown work piece after removal of remaining portions of the initial aluminum powder bed; and a piston skirt integrally joined to the AM piston crown work piece and to the ring carrier. In addition, after the cast iron ring carrier is joined with the AM piston crown work piece, the remaining portions of the piston may be continuously printed in the powder bed.

In another aspect of the present disclosure, the AM piston crown work piece includes a circumferential shoulder.

In another aspect of the present disclosure, a height of the circumferential shoulder is equal to a depth of the ring carrier.

In another aspect of the present disclosure, the ring carrier includes at least one positive engagement anti-rotation feature.

In another aspect of the present disclosure, the at least one positive engagement anti-rotation feature is slidably engaged within a slot created in the AM piston crown work piece.

In another aspect of the present disclosure, the at least one positive engagement anti-rotation feature defines first and second male keys integrally extending inwardly from the ring carrier and individually received in a first slot and a second slot created in the AM piston crown work piece.

In another aspect of the present disclosure, the ring carrier defines a cast iron ring carrier made by a weld buildup defining a cast iron ring carrier pre-assembly having an initial height.

In another aspect of the present disclosure, a base width of the cast iron ring carrier pre-assembly is equal to a desired final width of the cast iron ring carrier.

In another aspect of the present disclosure, an upper width of the ring carrier pre-assembly is greater than the base width and is formed by weld buildup along an inwardly tapered face of the AM piston crown work piece, the inwardly tapered face oriented at an angle alpha ($\alpha$) of 5 degrees or greater.

In another aspect of the present disclosure, the ring carrier is fixedly joined to the AM piston crown work piece using a process defining one of friction welding, fusion welding, ultrasonic metal welding or laser welding.

According to several aspects, a method to cast an automobile vehicle engine aluminum piston, comprises: printing an aluminum piston crown portion including an additive manufacturing (AM) piston crown work piece using initial aluminum powders defining an initial aluminum powder bed; removing the aluminum piston crown portion from the initial aluminum powder bed; fixedly joining a cast iron ring carrier to the AM piston crown work piece; placing the aluminum piston crown portion together with the ring carrier into a secondary and a tertiary aluminum powder bed; and printing a piston skirt integrally joined to the AM piston crown work piece and to the ring carrier.

In another aspect of the present disclosure, the method further includes performing the fixedly joining step by welding the ring carrier to the AM piston crown work piece using one of a friction welding process, a fusion welding process, an ultrasonic welding process and a laser welding process.

In another aspect of the present disclosure, the method further includes creating the ring carrier of one of a cast iron material or a metal matrix composite material prior to fixedly joining the ring carrier by a weld buildup.

In another aspect of the present disclosure, the method further includes: integrally extending a positive engagement anti-rotation feature from the ring carrier; and inserting the positive engagement anti-rotation feature into a slot formed in the AM piston crown work piece.

In another aspect of the present disclosure, the method further includes holding the AM piston crown work piece stationary while the ring carrier is either oscillated or rotated.

In another aspect of the present disclosure, the method further includes: oscillating the ring carrier at a frequency ranging between approximately 20-150 Hz and at an amplitude ranging between approximately 0.05-3 mm inclusive; and applying a pressure ranging between approximately 10-300 MPa. to fixedly join the ring carrier to the AM piston crown work piece.

In another aspect of the present disclosure, the method further includes: using a first material during the printing the aluminum piston crown portion step, and applying a second material different from the first material when printing the piston skirt.

According to several aspects, a method to manufacture an automobile vehicle engine aluminum piston, comprises: printing an aluminum piston crown portion including an additive manufacturing (AM) piston crown work piece using initial aluminum powders defining an initial aluminum powder bed; removing the aluminum piston crown portion from the initial aluminum powder bed; pre-heating a cast iron ring carrier to approximately 450 degrees C.; and pressing the cast iron ring carrier onto a shoulder of the AM piston crown work piece to fixedly join the cast iron ring carrier to the AM piston crown work piece.

In another aspect of the present disclosure, the method further includes: placing the aluminum piston crown portion together with the cast iron ring carrier into a secondary and a tertiary aluminum powder bed; and printing a piston skirt integrally connected to the AM piston crown work piece and to the cast iron ring carrier.

In another aspect of the present disclosure, the method further includes applying a pre-installation interference fit tolerance of approximately 50 μm to the cast iron ring carrier prior to pressing the cast iron ring carrier.

Further areas of applicability will become apparent from the description provided herein. It should be understood that the description and specific examples are intended for purposes of illustration only and are not intended to limit the scope of the present disclosure.

BRIEF DESCRIPTION OF THE DRAWINGS

The drawings described herein are for illustration purposes only and are not intended to limit the scope of the present disclosure in any way.

FIG. 2 is a cross sectional elevational view taken at section 2 of FIG. 1 of an aluminum piston crown portion created during a first formation printing increment;

FIG. 3 is a cross sectional elevational view of the aluminum piston crown portion of FIG. 2 after removal of an initial aluminum powder bed;

FIG. 4 is a cross sectional elevational view of the aluminum piston crown portion of FIG. 3 after press-fit installation of a cast iron ring carrier to create a first sub-assembly;

FIG. 5 is a cross sectional elevational view of the first sub-assembly after further addition of a secondary aluminum powder bed and printing;

FIG. 6 is a cross sectional elevational view of a second sub-assembly created from the first sub-assembly after further addition of a tertiary aluminum powder bed and printing;

FIG. 7 is a cross sectional elevational view of the second sub-assembly of FIG. 6 after removal of the tertiary aluminum powder bed;

DETAILED DESCRIPTION

The following description is merely exemplary in nature and is not intended to limit the present disclosure, application, or uses.

Figure 1:
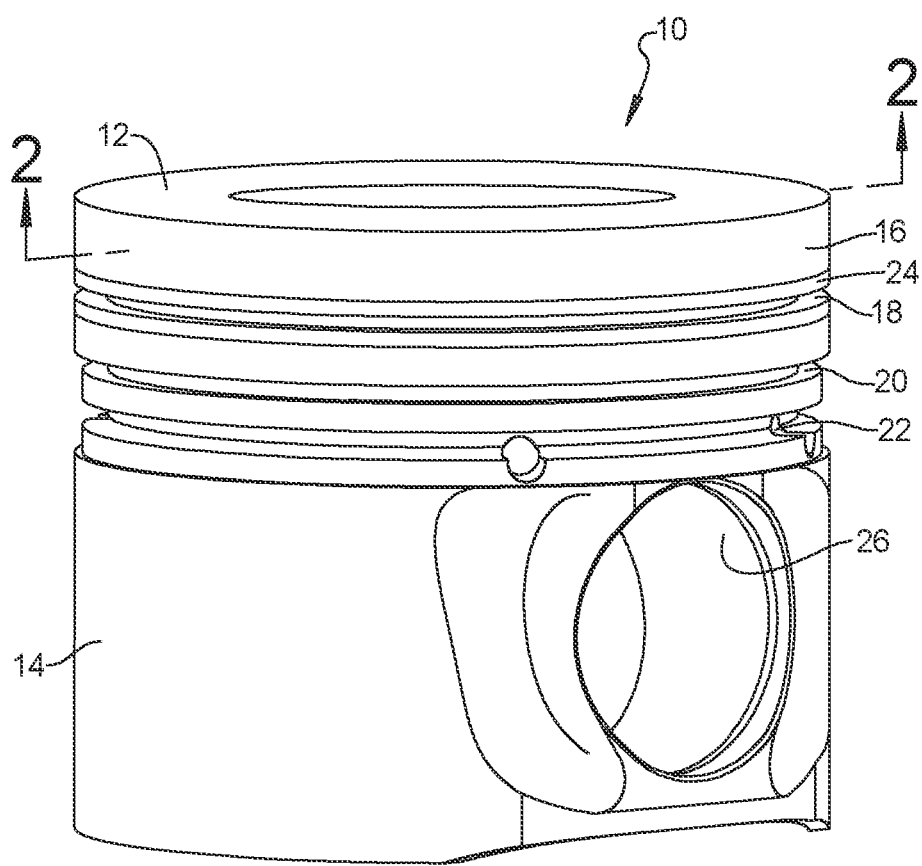
FIG. 1 is a front elevational perspective view of an aluminum piston having a cast iron ring carrier according to an exemplary aspect.

Referring to FIG. 1, an aluminum piston having a cast iron ring carrier made using powder bed fusion 10 includes a piston crown 12 integrally joined to a piston skirt 14. Multiple ring lands 16 are present between individual ones of a first ring groove 18, a second ring groove 20 and a third ring groove 22. According to several aspects, the ring grooves may be machined by multiple machining steps following completion of the powder bed fusion formation steps identified in reference to FIGS. 2 through 14. According to several aspects, the first ring groove 18 and the second ring groove 20 may define compression ring grooves and the third ring groove may define an oil ring groove. An insert 24 placed or formed during the powder bed fusion formation steps may be located at individual ones of the ring grooves, including at the first ring groove 18. As known, a wrist pin boss 26 may be provided with the piston skirt 14, which may be further machined to a final geometry following completion of the powder bed fusion formation steps.

Referring to FIGS. 2 through 7 and again to FIG. 1, multiple formation printing increments of an additive manufacturing (AM) process are used in manufacturing the aluminum piston having a cast iron carrier made using powder bed fusion 10. As shown more specifically in reference to FIG. 2, in a first formation printing increment an aluminum piston crown portion 28 is printed and includes an AM piston crown work piece 30 formed using initial aluminum powders 32 defining an initial aluminum powder bed. The AM piston crown work piece 30 includes a shoulder 34 circumferencing the AM piston crown work piece 30 having a shoulder height defining a height of a cast iron ring carrier to be subsequently installed as described in reference to FIG. 4.

Referring to FIG. 3 and again to FIG. 2, the initial aluminum powders 32 defining the initial aluminum powder bed defined in FIG. 2 are removed from around the AM piston crown work piece 30. This includes removal of the aluminum powders from about the shoulder 34.

Referring to FIG. 4 and again to FIG. 3, a cast iron ring carrier 36 is fixedly placed onto the shoulder 34 by pressing-in-place in a direction "A", downward as viewed in FIG. 4, to create a first sub-assembly 38. Prior to installation, the cast iron ring carrier 36 is first pre-heated to a temperature of approximately 450° C. or greater and includes a pre-installation interference fit tolerance of approximately 50 μm. After pre-heating, the cast iron ring carrier 36 is pressed-in-place onto the shoulder 34. The interference fit tolerance of approximately 50 μm ensures an interference fit between an inner ring surface 42 of the cast iron ring carrier 36 and a shoulder wall 40 of the cast iron ring carrier 36 after the cast iron ring carrier 36 subsequently cools to atmospheric temperature.

According to several aspects, after the cast iron ring carrier 36 is joined with the AM piston crown work piece 30, the remaining portions of the piston may be continuously printed in the powder bed. Also, according to several aspects a ring carrier made of a different material than cast iron may be used in place of the cast iron ring carrier 36. An alternate material may include metal matrix composites (MMC) or other materials.

Referring to FIG. 5 and again to FIG. 4, after placement of the cast iron ring carrier 36 to create the first sub-assembly 38, secondary aluminum powders 44 defining a secondary powder bed are filled up and leveled with an upper surface 46 of the first sub-assembly 38.

Referring to FIG. 6, the powder bed fusion process is continued by adding material to the first sub-assembly 38 as follows. Tertiary aluminum powders 48 are added and printing continues upward as shown in reference to FIG. 6 from the upper surface 46 of the first sub-assembly 38 shown in phantom, to form the piston skirt 14 up to an end face 50, creating a second sub-assembly 52. The wrist pin boss 26 may be provided with the piston skirt 14 during this printing process.

Referring to FIG. 7 and again to FIGS. 1 and 6, after removal of the tertiary aluminum powders 48 the completed second sub-assembly 52 may be cleaned and readied for further machining, for example to add the ring grooves described in reference to FIG. 1.

Referring to FIG. 8 and again to FIGS. 1 through 7, a printed subassembly 54 includes an AM piston crown work piece 56 modified from the AM piston crown work piece 30 to provide for a cast iron ring carrier pre-assembly 58 which is produced and defined by a weld buildup onto a shoulder 34' similar to the shoulder 34. The AM piston crown work piece 56 has a ring carrier buildup portion providing for the cast iron ring carrier pre-assembly 58 having an initial height 60. A base width 62 of the cast iron ring carrier pre-assembly 58 is equal to a desired final width of a subsequently machined ring carrier 68 shown and described in reference to FIG. 9. An upper width 64 of the cast iron ring carrier pre-assembly 58 is greater than the base width 62 and is formed by weld buildup along an inwardly tapered face 66. The inwardly tapered face 66 is oriented at an angle alpha (α) of 5 degrees or greater. In addition to the above weld buildup, a cast iron ring carrier may be cast and then machined into the required sizes.

Figure 8:
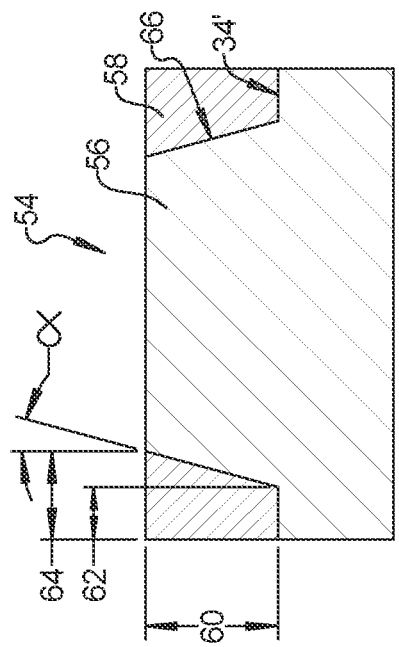
FIG. 8 is a cross sectional elevational view of an AM piston crown work piece after weld buildup to form a cast iron ring carrier.
Figure 11:
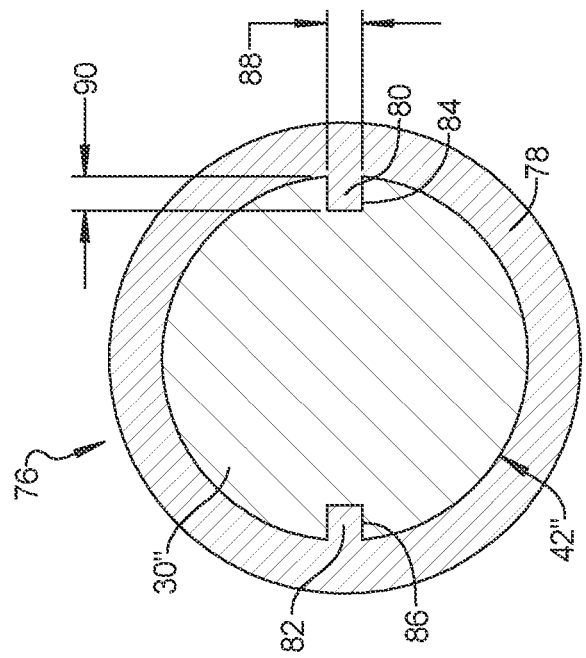
FIG. 11 is a top plan view of the AM piston crown work piece of FIG. 7 modified to include ring carrier anti-rotation features.

Referring to FIG. 9 and again to FIG. 8, an AM piston crown work piece 30' similar in final form to the AM piston crown work piece 30 is created by machining the cast iron ring carrier pre-assembly 58 and an upper portion of the AM piston crown work piece 56 down to a finished height 70. This machining operation leaves a welded-in-place cast iron ring carrier 68 which is dimensionally similar to the pressed-in-place cast iron ring carrier 36. A height 72 of a finished machined shoulder is substantially equal to a depth of the welded-in-place cast iron ring carrier 68 which is also substantially equal to a height of the cast iron ring carrier 36.

Referring to FIG. 10 and again to FIGS. 1 through 9, a finished diameter 73 of the AM piston crown work piece 30' is equal to the finished diameter of the AM piston crown work piece 30. A finished diameter 74 of the shoulder 42 is equal to the finished diameter of the shoulder 42 of the AM piston crown work piece 30.

Referring to FIG. 11 and again to FIGS. 1 through 10, to provide additional coupling between a pressed-in-place ring carrier with an AM piston crown work piece, an AM piston crown work piece 76 is modified from the AM piston crown work piece 30 to add positive engagement anti-rotation features to a cast iron ring carrier 78. The cast iron ring carrier 78 includes at least one and according to several aspects a first positive engagement anti-rotation feature 80 and an oppositely positioned second positive engagement anti-rotation feature 82. The positive engagement anti-rotation features define male keys integrally extending inwardly past the shoulder 42" of the cast iron ring carrier 78 and are individually received in a first slot 84 and a second slot 86 machined into an AM piston crown work piece 30" modified from the AM piston crown work piece 30 to include the slots. The first positive engagement anti-rotation feature 80 and the second positive engagement anti-rotation feature 82 individually have a width 88 and a depth 90 which may vary at the discretion of the designer.

Figure 9:
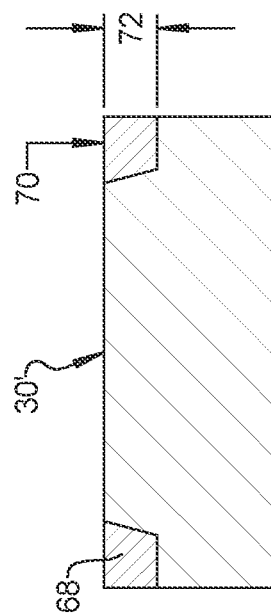
FIG. 9 is a cross sectional elevational view of the AM piston crown work piece of FIG. 8 after machining to a final geometry.
Figure 10:
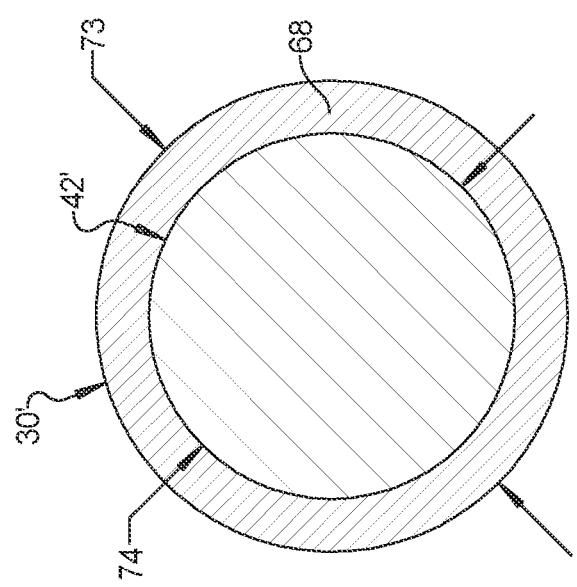
FIG. 10 is a top plan view of the AM piston crown work piece of FIG. 9.

With continuing reference to FIGS. 4, 8 and 9, the following discussion provides details of various welding processes which may be used to fixedly join or create the cast iron ring carrier to the AM piston crown work pieces including friction welding, fusion welding, ultrasonic metal welding and laser welding.

FRICTION WELDING: The AM piston crown work piece 30 is held stationary and the cast iron ring carrier 36 is either oscillated or rotated. The cast iron ring carrier 36 may be in oscillating motion at very high frequency defined as a frequency ranging between approximately 20-150 Hz and a small amplitude defined as an amplitude ranging between approximately 0.05-3 mm inclusive, with a normal pressure applied ranging between approximately 10-300 megapascal (MPa). The rotating process may be done via inertia welding. A flywheel (not shown) revolves until a pre-set speed is reached. A motor (not shown) is then disengaged from the flywheel and the AM aluminium piston is brought into contact under pressure with the rotating cast iron ring carrier 36.

A typical rotation speed of approximately 500 to 3000 rpm is used. A rotation time period is approximately 0.1-1 minute. A normal pressure applied is approximately 10 to 200 MPa. A final pressure for welding is approximately 90% of the yield strength of aluminum (Al) or an Al piston alloy to be welded (100-250 MPa). Friction welding offers minimum heat input with a minimum heat affected zone and has little influence on conductivity and material properties.

FUSION WELDING: Fusion welding is a generic term for welding processes that rely on melting to join materials of similar compositions and melting points. In the present disclosure, local melting in the interface area between cast iron ring carrier and the AM aluminium piston will be realized by electric resistance, induction or laser. A transition melting zone of approximately 50-250 um is created in the interface.

ULTRASONIC METAL WELDING: Ultrasonic welding produces coalescence by the local application of high-frequency vibratory energy as the cast iron ring carrier and the AM aluminium piston are held together under pressure. The combined clamping pressure plus the oscillating forces introduce dynamic stresses in the base metal. Ultrasonic energy also aids in cleaning the weld area by breaking up oxide films and causing them to be carried away.

LASER WELDING: A laser beam is passed through interface areas between the cast iron ring carrier and the AM aluminum piston. The molten aluminum, having a lower melting point material, will fill up any gap in the interface. Two beams may also be used in a single laser so that the metal remains molten longer and fills the weld more consistently.

An aluminum piston having a cast iron carrier made using powder bed fusion of the present disclosure includes a method to manufacture aluminum pistons having a cast iron compression ring carrier using a powder bed fusion (PBF) process. The aluminum piston crown portion, up to a height of the cast iron ring carrier, is first printed. The aluminum powders around the ring carrier area are then removed prior to placement or installation of the cast iron ring carrier. The cast iron ring carrier may be pressed-in-place (PIP) after preheating to a temperature above 450° C. with an interference fit tolerance of ~50 um. An anti-rotation feature may also be added. The cast iron ring carrier can also be welded to the additive manufacturing (AM) aluminum piston using friction, fusion, ultrasonic vibration, or laser processes. After placement or installation of the cast iron ring carrier, the aluminum powders are filled up and leveled around an area of the cast ring carrier. The PBF additive manufacturing (AM) process is then resumed to complete printing of the remaining portions of the piston.

An aluminum piston having a cast iron carrier made using powder bed fusion of the present disclosure offers several advantages. These include a new interrupted powder bed fusion (PBF) method to make aluminum pistons having a cast iron compression ring carrier. A top crown portion of the piston is first printed and then stopped to remove the powders in the cast iron ring carrier insert area. The cast iron ring carrier may be pressed-in-place with an interference fit tolerance of ~50 um as well as an anti-rotation feature for machining operations. The cast iron ring carrier may be preheated to >450 C prior to pressing using various heating methods such as induction, laser, etc. The cast iron ring carrier may also be welded to the AM piston using friction, fusion, ultrasonic vibration, or laser processes. An AM process recovery is applied to minimize the influence of process interruption such as during local heating with or without the new layer of powders, part-specific AM process parameters.

An interrupted powder bed fusion (PBF) method to make an aluminum piston with cast iron ring carrier of the present disclosure provides for a top crown portion of the piston to be first printed and then stopping the printing process to remove the powders in a cast iron ring carrier insert area. A special feature may be arranged in the AM machine to have the printed ring carrier insert area move above (higher than) the powder bed. The cast iron ring carrier may be pressed-in-place to the crown insert area with interference fit tolerance of ~50 um. Anti-rotation features may be added for machining operations of the ring carrier for the cases when no metallurgical bonding is present. The cast iron carrier may be preheated to >450 C prior to pressing. In-situ pre-heating of the cast iron ring carrier may be accomplished using induction, electromagnetic, laser, infrared, or a combination of these processes. The cast iron ring carrier may be welded to the AM piston using friction, fusion, ultrasonic vibration, or laser processes. A special AM process recovery is utilized to minimize an influence of the process interruption, such as local heating with or without the new layer of powders, part-specific AM process parameters, etc.

The first printed materials in the crown area may be different from the second material printed on the remaining part of the piston. The ring carrier may not be limited to only a cast iron material. For example, the ring carrier may be made of metal-matrix composites (MMC) or other materials. After being first printed, the top crown portion may be taken out of the printing machine to perform a deep surface cleaning to remove any possible loose powders on surfaces that will contact the ring carrier. Machining may also be performed to create a flat and clean interface surface for the other processes (such as friction welding and the like). A computer numerical control (CNC) program may use the same piston computer aided design (CAD) models to make a clean-up pass while components are still on the plate.

The description of the present disclosure is merely exemplary in nature and variations that do not depart from the gist of the present disclosure are intended to be within the scope of the present disclosure. Such variations are not to be regarded as a departure from the spirit and scope of the present disclosure.

What is claimed is:

1. A method to cast an automobile vehicle engine aluminum piston using powder bed fusion, comprising:
   printing an aluminum piston crown portion including an additive manufacturing (AM) piston crown work piece using initial aluminum powders defining an initial aluminum powder bed;
   removing the aluminum piston crown portion from the initial aluminum powder bed;
   fixedly joining a ring carrier to the AM piston crown work piece;
   placing the aluminum piston crown portion together with the ring carrier into a secondary and a tertiary aluminum powder bed; and
   adding a piston skirt integrally connected to the AM piston crown work piece and to the ring carrier.

2. The method of claim 1, further including performing the joining step by welding the ring carrier to the AM piston crown work piece using one of a friction welding process, a fusion welding process, an ultrasonic welding process and a laser welding process.

3. The method of claim 1, further including creating the ring carrier of one of a cast iron material or a metal matrix composite material prior to fixedly connecting the ring carrier by a weld buildup.

4. The method of claim 1, further including:
   integrally extending a positive engagement anti-rotation feature from the ring carrier; and
   inserting the positive engagement anti-rotation feature into a slot formed in the AM piston crown work piece.

5. The method of claim 1, further including holding the AM piston crown work piece stationary while the ring carrier is either oscillated or rotated.

6. The method of claim 5, further including:
   oscillating the ring carrier at a frequency ranging between approximately 20-150 Hz and at an amplitude ranging between approximately 0.05-3 mm inclusive; and
   applying a pressure ranging between approximately 10-300 MPa. to fixedly connect the ring carrier to the AM piston crown work piece.

7. The method of claim 1, further including:
   using a first material during the printing step, and
   applying a second material different from the first material when adding the piston skirt.

8. A method to manufacture an automobile vehicle engine aluminum piston, comprising:
   printing an aluminum piston crown portion including an additive manufacturing (AM) piston crown work piece using initial aluminum powders defining an initial aluminum powder bed;
   removing the aluminum piston crown portion from the initial aluminum powder bed;
   pre-heating a cast iron ring carrier to approximately 450 degrees C.; and
   pressing the cast iron ring carrier onto a shoulder of the AM piston crown work piece to fixedly connect the cast iron ring carrier to the AM piston crown work piece.

9. The method of claim 8, further including:
   placing the aluminum piston crown portion together with the cast iron ring carrier into a secondary and a tertiary aluminum powder bed; and
   printing a piston skirt integrally connected to the AM piston crown work piece and to the cast iron ring carrier.

10. The method of claim 8, further including applying a pre-installation interference fit tolerance of approximately 50 μm to the cast iron ring carrier prior to pressing the cast iron ring carrier.

* * * * *